United States Patent

[11] 3,568,052

[72] Inventor William W. Anderson
 205B Boxwood Road, Annapolis, Md. 21403
[21] Appl. No. 830,971
[22] Filed June 6, 1969
[45] Patented Mar. 2, 1971
 Continuation of application Ser. No. 414,926, Nov. 30, 1964, now abandoned.

[54] TIME INTERVAL MAGNETOMETER
 9 Claims, 4 Drawing Figs.
[52] U.S. Cl. .................................. 324/43
[51] Int. Cl. .................................. G01r 33/02
[50] Field of Search .................................. 324/43, 47

[56] References Cited
UNITED STATES PATENTS
2,743,416 4/1956 Kelly, Jr. .................... 324/43
3,258,687 6/1966 Heppner et al. .............. 324/43
FOREIGN PATENTS
119,600 1/1958 U.S.S.R. ...................... 324/43
1,371,453 7/1964 France ........................ 324/43

OTHER REFERENCES
Millman & Taub; Pulse and Digital Circuits; McGraw Hill Book Company; New York; 1956 pp 508—509

Primary Examiner—Rudolph V. Rolinec
Assistant Examiner—R. J. Corcoran
Attorneys—L. A. Miller, Q. E. Hodges and A. Sopp ABSTRACT: A magnetometer system having a probe core of ferromagnetic material with a primary and secondary winding, the primary winding being driven by a linear ramp current from a constant current driver which current rises during one-half cycle of the cycle of an astable multivibrator to drive the core through its minimum flux density to saturation. The output pulse appearing in the secondary winding of the probe as the saturation of the probe passes through 180° is shifted in time by the presence of an external magnetic field as the driver current rises with time. This time interval shift is measured and corresponds directly to the magnitude of the external magnetic field.

INVENTOR
WILLIAM W. ANDERSON

INVENTOR
WILLIAM W. ANDERSON

TIME INTERVAL MAGNETOMETER

This application is a continuation of application Ser. No. 414,926, filed Nov. 30, 1964 now abandoned.

BACKGROUND OF THE INVENTION

The invention described herein may be manufactured and used by or for the Government of the United States of America for Governmental purposes without the payment of any royalties thereon or therefor.

The present invention relates to magnetometers and more particularly to a magnetometer capable of measuring magnetic fields in the range from below one gamma to greater than 1 oerstead.

Generally the prior art magnetometers, which are capable of successfully measuring fields are of the following types: fluxmeters, hall effect magnetometers, second harmonic magnetometers, rotating coil flux meters, ballastic galvanometers, induction magnetometers, and nuclear magnetic resonance magnetometers. However, the aforementioned types of magnetometers have one or more of the following limitations: cannot measure nonalternating magnetic fields, low sensitivity, subject to drift of components, require matching of cores, restricted to analogue output, depend on phase and amplitude measurements, and are expensive to manufacture.

The present invention eliminates or greatly reduces such limitations in devices for detecting and measuring a magnetic field by utilizing one or more sets of windings on a single ferromagnetic core in combination with a source of driving waveforms to cause the magnetic core to produce pulselike output waveforms having a duration or time interval which is a function of the driving waveforms and the external magnetic field present along the core axis. These pulselike waveforms occur as a result of the ferromagnetic core passing from a condition of saturation through a condition of nonsaturation, and then back into saturation at approximately that point of zero magnetic field along the core axis. The magnetic field along the core axis is a combination of both the field produced by the primary winding and the external field. The resultant magnetic field along the core axis will be zero for differing values of the primary magnetic field (the magnetic field produced by the primary winding). Thus, the magnitude of the displacement of this zero point in time depends on the value of the external magnetic fields along the axis of the core. Cores made out of ferromagnetic materials and in particular grain oriented materials have extremely high permeability and low coercive force. Thus, there is a much larger flux change resulting from changes in the primary current at the time the core field is not saturated or zero, than at other times when the core material is in or near saturation. Therefore, this change in flux produces a pulse which occurs at or predictably near the point in time the core is in a state of nonsaturation.

An object of the invention is to provide a sensitive magnetometer for measuring magnetic fields in the range from below one gamma to greater than an oersted.

A further object of the invention is to provide a magnetometer capable of measuring alternating and nonalternating magnetic fields.

Still another object of the invention is to provide a magnetometer capable of producing an output which may be in either analogue or in digital form.

Still a further object of the invention is to provide a magnetometer which overcomes the prior art limitations and is relatively inexpensive to manufacture.

Other objects and many of the attendant advantages of this invention will be readily appreciated as the same becomes better understood by reference to the following detailed description when considered in connection with the accompanying drawings wherein:

DESCRIPTION OF THE PREFERRED EMBODIMENT

Figure 1:
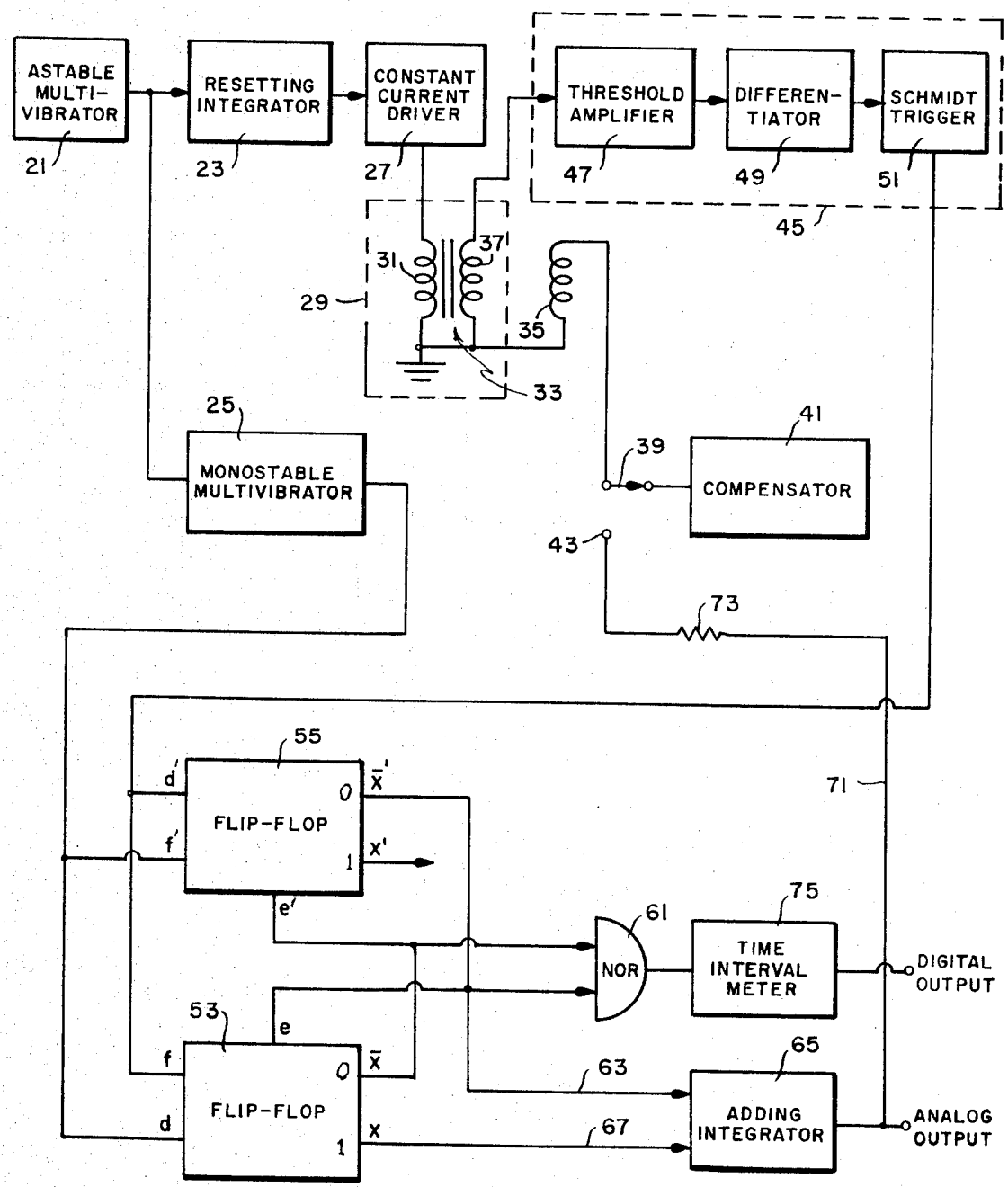
FIG. 1 is a block diagram of a time interval magnetometer in accordance with the invention.

Referring to FIG. 1 an astable multivibrator 21 is provided for continuously generating pulses. A suitable astable multivibrator is illustrated in "Basic Electronics" prepared by the Bureau of Naval Personnel, Navpers 10087A U.S. Government Printing Office, Washington, D.C., 1955, Revised 1962, page 224—5, FIG. 9—16. However, other forms of oscillators or pulse generators may be utilized. The output of the astable multivibrator is connected to the input of resetting integrator 23 (which may be any linear sawtooth wave generator). Alternatively, in place of elements 21, 23, any suitable sawtooth wave generator may be employed. By way of illustration, and not limitation, linear sawtooth generators of the type found in U.S. Pat. No. 2,597,322, issued to W A. Higinbotham or in U.S. Pat. No. 2,835,809, issued to J.W. Taylor, Jr. may be employed. A constant current generator 27 has its input connected to the output of the resetting integrator 23. The input of a monostable multivibrator 25 is connected to the output of the astable multivibrator 21. It is to be understood however, that the illustrated waveform generator consisting of an astable multivibrator 21, resetting integrator 23, and constant current driver 27 may be eliminated and other types of driving sources can be utilized. These driving sources may be either linear or nonlinear provided that in the case of the nonlinear source, the nonlinearity is taken into account. This is possible because the driving source produces a known signal which can be displayed and compared with the output for the purpose of eliminating the effects of the nonlinearity. For example, a logarithimic source may be used as a nonlinear source to increase the dynamic range of the system. In addition, when the system is operated with a closed feedback loop, the nonlinearity does not appreciably affect the system, as will be explained hereinafter.

A probe 29 contains a primary winding 31 partially enclosing a saturable core 33. The saturable core should preferably be made of high permeability ferromagnetic material. The core material should preferably be relatively thin and the core length should be relatively long compared to the length of the driving coil so that it saturates more readily. A compensation or feedback coil 35 partially encloses the saturable core 33. A secondary winding 37 is also provided on core 33 for sensing an output pulse. If desired, secondary winding 37 may be eliminated, and the output may be taken directly from the primary winding 31. A switch 39 connects the compensation or feedback coil 35 to compensator 41 when it is in the first position. The compensator 41 is high stability DC power supply for supplying a controlled amount of current for cancelling out portions of the ambient field, which will be discussed below. Switch 39 is selectively connected to the compensator 41 or the terminal 43 of the feedback loop.

The winding 37, or 31 in the above alternative case, is connected to the input of a pulse detector 45 which comprises a threshold amplifier 47, differentiator 49 and a Schmitt trigger 51. The winding 37 is connected to the input of the threshold amplifier 47 and the output of the threshold amplifier 47 is connected to the input differentiator 49. The output of the differentiator 49 is connected to the input of a Schmitt trigger 51. A suitable Schmitt trigger for use in the invention is illustrated on page 210, FIG. 205 of "Basic Theory and Application of Transistors" TM11-690 by Headquarters, Department of the Army, Mar. 1959. The output of the Schmitt trigger 51 is connected to the $p$ input of flip-flop 53 and to the $d'$ input of flip-flop 55 which may be of the type disclosed and described in the publication, NavWeps 16—1—519. The output of the monostable multivibrator 25 is connected to the $f$ input of flip-flop 55 and to the $d$ input of flip-flop 53. Each of flip-flops 53 and 55 is identical to Preferred Circuit 212 of NavWeps 16−1−519 prepared by the National Bureau of Standards for the Navy Bureau of Weapons and published in 1960 except that the circuits were redesigned according to standard techniques to respond to negative going pulses rather than positive going pulses. This was accomplished by reversing the polarity of the voltage sources from that shown in circuit 212 and the diodes polarity is reversed in each instance and NPN transistors were used in place of the PNP transistors shown in the referenced circuit.

As shown in FIG. 1 the flip-flops 53 and 55 are interconnected with the output $\overline{X}'''$ of flip-flop 55 connected to terminal $e$ of flip-flop 53 where terminal $e$ is the input to the disable circuit of flip-flop 53 and the $\overline{X}$ output of flip-flop 53 connected to the disable circuit terminal $e'$ of flip-flop 55. The operation of the disable circuit in each of the flip-flops is recognized as standard and is described in the referenced Preferred Circuit 212. It is to be noted that in FIG. 1, $\overline{X}$ and $<\overline{X}'$ are the 0 outputs and X and X' are the 1 outputs.

Figure 4:
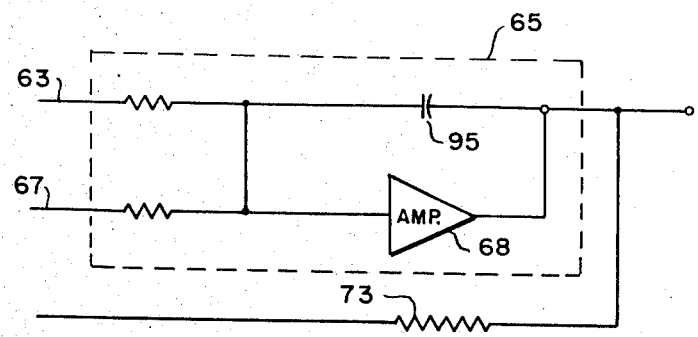
FIG. 4 is a circuit diagram of a suitable adding integrator which may be utilized in the embodiment of the invention illustrated in FIG. 1.

The 0 output of flip-flop 53 is connected to one input of a NOR circuit 61 and the 1 output of flip-flop 53 is connected via lead 67 to an adding integrator 65. When modified as shown in FIG. 4, the 1 output from flip-flop 53 is connected via lead 67 through an operational amplifier 68 within integrator 65. The 0 output of flip-flop 55 is connected to a second input of NOR circuit 61 and via lead 63 to the other input of the adding integrator 65. A feedback loop 71 has one end connected to the output of the adding integrator 65 through a resistor 73. The other end of the feedback loop is connected to terminal 43. The output of the NOR circuit is connected to the input of a time interval meter 75 which produces a digital output indicative of the elapsed time.

DESCRIPTION OF THE OPERATION

Figure 2:
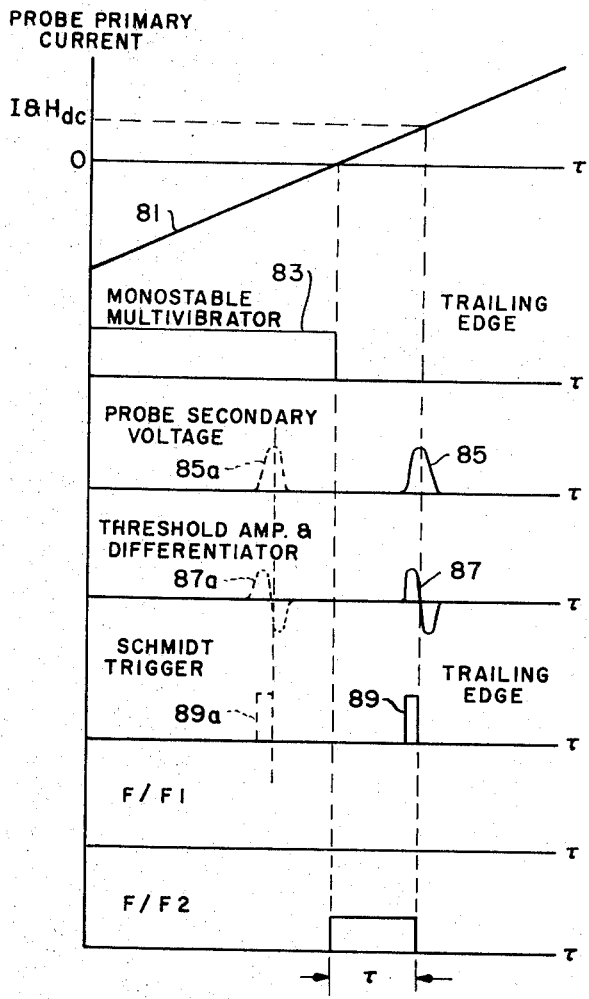
FIG. 2 illustrates the sequence of pulses as they occur at various points of the system of FIG. 1.
Figure 3:
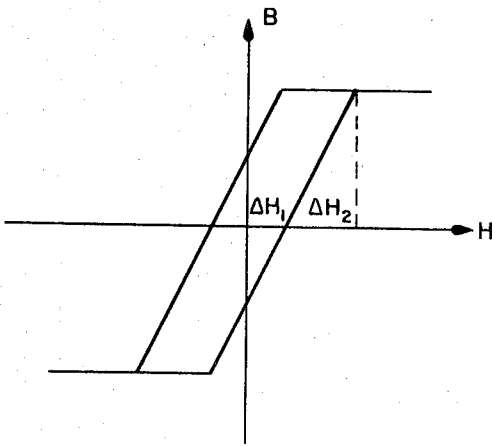
FIG. 3 is a diagram of theoretical characteristics of a core material suitable for use in the system illustrated in FIG. 1.

The operation of the system of FIG. 1 will be discussed with reference to FIGS. 2, 3, and 4. The astable multivibrator 21 generates a series of square waves for driving the resetting integrator 23. The output of the resetting integrator 23 is a linear sawtooth wave which drives the constant current driver 27. The primary winding 31 of the sensing element is driven by a linear ramp current which is applied by the output of the constant current driver.

In the present example, during most of the time required for one cycle of the current ramp, the probe is in saturation. However, during a small part of the time necessary to complete one cycle, the magnetic field along the core axis produced by the ramp current produces at some point of time in each cycle of the current ramp a zero or near zero magnetic field along the core axis causing the core to pass through a condition of nonsaturation and high rate of flux change.

During this small time interval of nonsaturation, the effective rate of flux change of the core is greatly increased over its rate of flux change when it is saturated, consequently the coupling between the probe primary and secondary windings is greatly increased during this small time interval of nonsaturation. Such changes in rate of flux change produce a voltage pulse 85 having a peak occurring at the time the field in the core is zero. When the core is subjected to an additional external field the point in time at which the core passes through the interval of nonsaturation is shifted in time, the direction of the shift being determined by whether the external field aids or opposes the field set up by the ramp current. The compensator 41 supplies a constant direct current of any suitable value, including zero, to winding 35 which generates a magnetic field for cancelling out portions of the ambient magnetic field along the probe axis, depending upon whether it is desired to observe the full value of magnetic field intensity $H_{dc}$, or the change in the magnetic field around some arbitrary base line.

The compensator 41 contains means for adjusting the amount of direct current supplied to the compensation coil and also indicates the amount of current supplied from which a magnetic field base line can be accurately determined. The compensator 41 may, of course, be employed in either the analogue or digital mode. The switch 39 connects the compensator or the feedback loop to the compensation or feedback coil 35. When the magnetometer is used in the analogue mode the switch 39 normally connects winding 35 to terminal 43. If it is desired to provide compensation during operation in the analogue mode, an additional winding may be added to the probe and connected to compensator 41.

The threshold amplifier 47 has a threshold greater than the inherent noise of the system to prevent spurious indications from being generated. The pulse 85 generated by the core 33 as it passes through zero saturation triggers the threshold amplifier 47 causing the differentiator 49 to generate an output pulse 87 which triggers the Schmitt trigger 51. The output pulse 89 of the Schmitt trigger 51 may be a rectangular pulse having sharp edges.

The output pulse of the astable multivibrator 21 is utilized to trigger the monostable multivibrator 25 to generate an output pulse 83. The beginning of the monostable state of the monostable multivibrator determines the beginning of pulse 83 and occurs simultaneously with the beginning of the ramp current which drives the probe coil. The duration of the monostable state of the monostable multivibrator 25 determines the duration of pulse 83 whose end may be preset to occur at the time the net axial field in the probe core would be zero if no external magnetic field is present along the core axis.

The time T between the trailing edge of pulse 89 produced by the Schmitt trigger 51 and the trailing edge of the monostable multivibrator output pulse 83 is directly proportional to the magnetic field present along the core axis. The polarity of the external magnetic field is related to the time sequency of occurrence of the trailing edges of the pulses produced by the Schmitt trigger 51 and the monostable multivibrator 25. Therefore, a convention may be adopted such that the polarity of the external magnetic field is positive when the trailing edge of the pulse 89 generated by the Schmitt trigger lags the trailing edge of the pulse 83 generated by the nonstable multivibrator as shown in FIG. 2 and is negative when the trailing edge of pulse 89 leads the trailing edge of pulse 83. The direction of the arrow in FIG. 3 indicates a positive external magnetic field intensity ($H_{dc}$).

Assuming that a positive external magnetic field is present, then the trailing edge of the pulse 83 generated by the monostable multivibrator 25 is applied to terminal $f$ of flip-flop 55 to cause 55 to change state. The trailing edge of the pulse 83 generated by the monostable multivibrator 25 is also applied to the $d$ terminal of flip-flop 53 but on this terminal the pulse is ineffective to change the state of 53.

Based on the assumption that initially the outputs on the $\overline{X}$ and $\overline{X}'$ terminals are zero, the change of state of flip-flop 55 turns the NOR gate 61 off starting the time interval meter 75 which may produce a digital output. The trailing edge of pulse 89 produced by the Schmitt trigger 51 is fed to the $f$ input of flip-flop 53 triggered to tend to cause flip-flop 53 to change state, but 53 cannot change state because the output of 55 applied to the disable input $e$ of flip-flop 53. The trailing edge of pulse 89 produced by the Schmitt trigger 51 is simultaneously fed to the $d'$ input of flip-flop 55 causing the flip-flop 55 to change state again, which by turning the NOR gate 61 on stops the time interval meter 75. However, if a negative external magnetic field is present then the output pulse 89a of the Schmitt trigger 51 will lead the output pulse 83 of the monostable multivibrator, and will cause flip-flop 53 to change state instead of flip-flop 55 as described above. The output pulse of flip-flop 53 turns the NOR gate 61 off starting the time interval meter 75. The disable circuit of input $e$ holds flip-flop 55 off. The pulse 83 generated by the monostable multivibrator turns flip-flop 53 off which turns the NOR gate 61 on, stopping the time interval meter.

In the analogue mode of operation, the probe compensation coil 35 is connected to the adding integrator 65 via a resistor 73 to form a feedback loop. The integrator 65 receives the 1 output pulses from the flip-flop 53 or O output pulses from flip-flop 55, the sequence of the two events depending upon whether the external magnetic field is positive or negative, which are integrated by the capacitor 95. The value of resistor 73 determines the amount of feedback and hence may be adjusted for optimum system stability. The feedback signal eliminates or substantially reduces the errors caused by nonlinearities present in the system drift of components and core characteristics by supplying part of the output signal back to the compensation coil 35 for generating a compensating magnetic field. An analogue output signal may be taken from the adding integrator output and may be displayed on a suitable meter. The analogue mode of the invention provides a lower resolution output than the digital mode. The digital mode of the invention is capable of measuring over a restricted dynamic range external field intensities having a resolution of the order of 100,000 to 1. The analogue mode of the invention which is capable of measuring over a broader dynamic range of external magnetic field intensities having a resolution of 1,000 to 1.

As an alternative, sine wave producing means may be used instead of sawtooth generating means to provide the driving waveforms. A phase shifter may be used in place of the monostable multivibrator to provide the time reference signals. The sine wave generator has little effect on the operation of the system in the analogue mode. Effects on the system in the digital mode are predictable and not deleterious because the waveform is essentially linear near its zero axis.

The invention can be used to measure electric fields by substituting a ferroelectric core material such as Barium Titanate ($B_aT_iO$) for the saturable magnetic core. In this embodiment a constant voltage driver is substituted for the constant current driver. The rest of the system operates as heretofore explained.

Provision can be made for measuring field gradients by providing two pulses. In this case, an extra threshold amplifier, differentiator and Schmitt trigger would be used instead of the monostable multivibrator for generating a comparison pulse. If the fields along the two probes were the same, the two pulses (one from each Schmitt trigger) would occur at the same time. However, if there was a field difference along the two probes, the pulse would be spaced in time. This time spacing is proportional to the field difference and the amount of time is a measure of field difference (magnetic field gradient).

Obviously many modifications and variations of the present invention are possible in the light of the above teachings.

I claim:

1. Apparatus for measuring an external magnetic field comprising:
   a pulse generating means for providing a source of driving pulses;
   a monostable multivibrator having an input and an output, said monostable multivibrator input being coupled to said pulse generating means for producing output pulses of a predetermined time interval;
   sensing means having a saturable core of high permeability core material, exposed to the external field to be measured, said core means being coupled to said source of driving pulses, said driving pulses causing said saturable core to pass from saturation through a condition of nonsaturation including zero magnetization; the monostable multivibrator being preset so that the termination of each output pulse of a predetermined time interval occurs at the time the net field in the saturable core would be zero if no external magnetic field were present in the core;
   means coupled to said saturable core for detecting the point in time said core passes through said condition of zero magnetization; and
   means connected to said detecting means and connected to receive said output pulses of said monostable multivibrator for indicating the difference in time between the point in time said core passes through said condition of zero magnetization and the termination of one of said pulses of a predetermined time.

2. Apparatus for measuring an external magnetic field as defined in claim 1 but further characterized by having said means for detecting the point in time said core passes through said condition of zero magnetization comprising a threshold amplifier having an input and an output, said threshold amplifier input coupled to said saturable core;
   a Schmitt trigger having an input and an output, said Schmitt trigger input being coupled between said threshold amplifier output and said difference indicating means.

3. Apparatus for measuring an external magnetic field comprising:
   a pulse generating means for providing a source of driving pulses;
   a monostable multivibrator having an input and an output, said monostable multivibrator input being coupled to said pulse generating means for producing output pulses of a predetermined time interval;
   sensing means having a saturable core of high permeability core material, said core means being coupled to said source of driving pulses, said driving pulses causing said saturable core to pass from saturation through a condition of nonsaturation including zero magnetization;
   means coupled to said saturable core for detecting the point in time said core passes through said condition of zero magnetization;
   means coupled to said saturable core for detecting the point in time said core passes through said condition of zero magnetization;
   means connected to said detecting means and connected to receive said output pulses of said monostable multivibrator for indicating the difference in time between the point in time said core passes through said condition of zero magnetization and the termination of one of said pulses of a predetermined time interval whereby the measurement of said external magnetic field is proportional to the measured time interval;
   said means for indicating the difference in time comprises a first flip-flop having a pair of inputs, designated as $d$ and $f$, a pair of outputs designated as $\bar{Z}$ or O and Z or 1, and a disable input designated as $e$;
   a second flip-flop having inputs $d'$ and $f'$, and $\bar{Z}'$ or O output and a disable input $e'$ corresponding to said first flip-flop;
   The output of said monostable multivibrator being connected to said $f$ input and to said $d$ input of said second and said first flip-flops, respectively, to provide a reference point for the measurement of the time interval;
   said means for detecting the point in time said saturable core passes through said condition of zero magnetization having its output connected to the $f$ input of said first flip-flop and to said $d$ input of said second flip-flop, said first and said second flip-flop each having disabling means and being interconnected so that the one flip-flop will inhibit the change of state of the other for a complete cycle of said driving pulses, means connected to the O outputs of both flip-flops for measuring the time interval between the signals appearing on the respective O outputs, whereby, when a negative external magnetic field is present, said first flip-flop is being activated, the time interval of its period of activation is related to the amplitude of said negative external magnetic field and whereby, when a positive external magnetic field is present, said second flip-flop is activated, the time interval of its period of activation is related to the amplitude of said positive external magnetic field.

4. Apparatus for measuring an external magnetic field as defined in claim 3 but further characterized by having means for integrating said 1 output of said first flip-flop and said O output of said second flip-flop whereby the analogue output of said integrating means is indicative of said external magnetic field.

5. Apparatus for measuring an external magnetic field as defined in claim 4, but further characterized by having said means for detecting the point in time passes through said condition of zero magnetization comprising a threshold amplifier having an input and an output, said threshold amplifier input being coupled to said saturable core; a Schmitt trigger having an input and an output, said Schmitt trigger input being connected between said threshold amplifier output and said means for indicating the difference in time.

6. Apparatus for measuring an external magnetic field as defined in claim 5 wherein said means connected to said O outputs includes:
  a NOR gate having a pair of inputs and an output, one of said NOR gate inputs being coupled to said O output of said first flip-flop and said other NOR gate input being coupled to said O of said second flip-flop; and
  a digital time interval means having its input coupled to the output of said NOR gate.

7. Apparatus for measuring an external magnetic field as defined in claim 3 but further characterized by having said means for detecting the point in time said core passes through said condition of zero magnetization comprising:
  a threshold amplifier having an input and an output, said threshold amplifier input coupled to said saturable core; and
  a Schmitt trigger having an input and an output, said Schmitt trigger input being connected between said threshold amplifier output and said means for indicating the difference in time.

8. Apparatus for measuring an external magnetic field as defined in claim 7 wherein said means connected to said O outputs includes:
  a NOR gate having a pair of inputs and an output, one of said NOR gate inputs being coupled to said O output of said first flip-flop and said other NOR gate input being coupled to said O output of said second flip-flop; and
  a digital time interval means having its input coupled to the output of said NOR gate.

9. Apparatus for measuring an external magnetic field comprising:
  an astable multivibrator having an output;
  a linear sawtooth wave generator having an input and an output, said linear sawtooth wave generator input being coupled to said astable multivibrator output;
  a constant current driver having an input and an output, said constant current driver input being coupled to said linear sawtooth wave generator output;
  a single saturable core probe means coupled to said constant current driver output;
  a threshold amplifier having an input and an output, said threshold amplifier input being coupled to said saturable core;
  a Schmitt trigger having an input and an output, said Schmitt trigger input being coupled to said threshold amplifier output;
  a monostable multivibrator having an input and an output, said multivibrator input being coupled to said astable multivibrator output;
  a first flip-flop having a plurality of inputs and a pair of outputs designated as $f$ input, $d$ input and an $e$ input, an O output and a 1 output, said first flip-flop $f$ input being coupled to said Schmitt trigger output, said flip-flop $d$ input being coupled to said monostable multivibrator output;
  a second flip-flop having inputs and outputs corresponding to those of said first flip-flop and designates as a $f'$ input, a $d'$ input and an $e'$ input, and an O output, said second flip-flop $f'$ input being connected to said monostable multivibrator output, said flip-flop $d'$ input being coupled to said Schmitt trigger output;
  means interconnecting said first and second flip-flops for holding the flip-flop which has not been triggered on to an off condition after the other of said flip-flops has been triggered on;
  a NOR gate having a pair of inputs and an output, one of said NOR gate inputs being connected to said first flip-flop O output and said other one of said NOR gate inputs connected to said second flip-flop O output;
  a digital time interval meter having its input connected to said NOR gate output; and
  an adding integrator having a pair of inputs said first input coupled to said first flip-flop 1 output and said second integrator input being coupled to said second flip-flop O output whereby the digital output of the digital time interval meter and the analogue output of the adding integrator are proportion to and a measurement of the external magnetic field.